(12) United States Patent
Shan et al.

(10) Patent No.: US 9,120,277 B2
(45) Date of Patent: Sep. 1, 2015

(54) PROCESS OF DRILLING ORGANIC GLASSES USING A THERMOPLASTIC FILM PROTECTING AGAINST CRACKING AND CRAZING

(71) Applicant: ESSILOR INTERNATIONAL (COMPAGNIE GENERALE D'OPTIQUE), Charenton-le-Pont (FR)

(72) Inventors: Haifeng Shan, St. Petersburg, FL (US); Robert Rist, St. Petersburg, FL (US); Richard Muisener, St. Petersburg, FL (US); Aref Jallouli, St. Petersburg, FL (US)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 149 days.

(21) Appl. No.: 13/954,275

(22) Filed: Jul. 30, 2013

(65) Prior Publication Data

US 2014/0034226 A1 Feb. 6, 2014

Related U.S. Application Data

(63) Continuation-in-part of application No. PCT/US2011/024277, filed on Feb. 10, 2011.

(51) Int. Cl.
| | |
|---|---|
| *B32B 38/04* | (2006.01) |
| *B32B 17/10* | (2006.01) |
| *G02C 7/02* | (2006.01) |
| *B29D 11/00* | (2006.01) |
| *B28D 1/14* | (2006.01) |
| *G02C 13/00* | (2006.01) |

(52) U.S. Cl.
CPC ............... *B29D 11/00* (2013.01); *B28D 1/143* (2013.01); *B29D 11/00432* (2013.01); *B32B 17/1055* (2013.01); *B32B 38/04* (2013.01); *G02C 7/02* (2013.01); *G02C 13/001* (2013.01); *Y10T 156/1056* (2015.01); *Y10T 156/1057* (2015.01); *Y10T 156/12* (2015.01)

(58) Field of Classification Search
CPC ............ B32B 17/1055; B32B 17/1077; B32B 17/10724; B32B 17/10807; B32B 17/1099; B32B 38/0004; B32B 38/04; B28D 1/143; G02C 7/02; G02C 13/001; C03B 22/074; C03B 22/02; Y10T 156/1056; Y10T 156/12
See application file for complete search history.

(56) References Cited

U.S. PATENT DOCUMENTS

| | | | |
|---|---|---|---|
| 4,643,936 A * | 2/1987 | Eidal | .............. 428/214 |
| 5,067,859 A | 11/1991 | Korbonski | |
| 5,733,077 A | 3/1998 | MacIntosh, Jr. | |
| 5,792,537 A | 8/1998 | Ohlin, Jr. | |
| 7,135,545 B2 | 11/2006 | Yang et al. | |
| 7,726,808 B1 | 6/2010 | Kitchloo et al. | |
| 2008/0117382 A1 | 5/2008 | Lacan et al. | |
| 2010/0200541 A1 | 8/2010 | Habassi et al. | |
| 2010/0310874 A1 | 12/2010 | Acheritobehere et al. | |

FOREIGN PATENT DOCUMENTS

| | | | |
|---|---|---|---|
| DE | 4438634 | 5/1996 | |
| EP | 1 392 613 | 11/2002 | |
| EP | 1 684 097 | 7/2006 | |
| EP | 1 992 460 A2 * | 11/2008 | ............... B26F 1/26 |
| JP | 02009256113 A * | 11/2009 | .............. C03B 33/02 |

* cited by examiner

*Primary Examiner* — Linda L Gray
(74) *Attorney, Agent, or Firm* — Vedder Price P.C.; Thomas J. Kowalski; Deborah L. Lu

(57) ABSTRACT

The present invention is drawn to a process of drilling organic glasses, comprising the steps of:
  (a) providing a substrate of organic glass, preferably of optical grade,
  (b) laminating onto at least one surface of said organic glass substrate via an adhesive layer selected from the group consisting of pressure sensitive adhesives and hot melt adhesives, a thermoplastic polymer film having a thickness of at least 40 μm and an elastic modulus of at least 3 GPa, the peel strength of the thermoplastic polymer on the organic glass substrate being higher than 1.3 N/25 mm, preferably of at least 1.5N/25 mm,
  (c) drilling a hole through the substrate and polymer film by means of a drill, and
  (d) optionally removing the thermoplastic polymer film and adhesive.

12 Claims, No Drawings

PROCESS OF DRILLING ORGANIC GLASSES USING A THERMOPLASTIC FILM PROTECTING AGAINST CRACKING AND CRAZING

CROSS-REFERENCE TO RELATED APPLICATIONS

This application is a continuation-in-part of International Patent Application No. PCT/US2011/024277, filed Feb. 10, 2011, and published as WO 2012/108866.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to the use of a thermoplastic polymer film having high elastic modulus for improving the drilling ability of organic glasses, preferably organic ophthalmic lenses.

BACKGROUND

The manufacturing of rimless spectacles comprises the attachment of the temples and the nose-bridge directly onto the ophthalmic lens. This generally requires drilling a through-hole in at least two points of the ophthalmic lenses in the peripheral region thereof. A common problem associated with rimless spectacles is the incidence of cracking and crazing in the lens during the drilling process, and the propagation of the cracks during the mounting of the temples or nose-bridge or and/or during the subsequent daily use of the spectacles.

One approach to reducing the incidence of cracking flaws associated with rimless spectacles is to employ lenses composed of selected materials having an increased resistance to such flaws as disclosed in U.S. Pat. No. 7,135,545.

U.S. Pat. No. 7,726,808 discloses polishing the borehole's side-wall with an abrasive wire so as to eliminate the microcracks and crazes, thereby preventing propagation thereof in the lens during mounting and use.

It is an object of the present invention to further improve the drilling ability or drilling resistance of organic lens substrates, by laminating onto said lens substrate an impact-absorbing thermoplastic film via an adhesive layer. The present invention is based on the discovery that such a film efficiently absorbs the drilling stress only if its elastic modulus has a minimum value of about 3 GPa and if it sticks to the lens substrate with a minimum adhesion strength. As a matter of fact, the Applicants observed that when thermoplastic films having a high enough elastic modulus were laminated onto ophthalmic lenses having a final anti-smudge overcoat, chipping during drilling could not be efficiently prevented.

SUMMARY OF THE INVENTION

The subject-matter of the present invention therefore is a method for drilling organic glasses, comprising the following steps:
(a) providing a substrate of organic glass, preferably of optical grade,
(b) laminating onto at least one surface of said organic glass substrate via an adhesive layer selected from the group consisting of pressure sensitive adhesives and hot melt adhesives, a thermoplastic polymer film having a thickness of at least 40 μm and an elastic modulus of at least 3 GPa, the peel strength of the thermoplastic polymer on the organic glass substrate being higher than 1.3 N/25 mm, preferably of at least 1.5 N/25 mm, and
(c) drilling a hole through the substrate and polymer film by means of a drill.

DETAILED DESCRIPTION

One important feature in the method of the present invention is the presence of a thermoplastic polymer film having a high elastic modulus, during the drilling step. It is believed that this film, and possibly also the adhesive, absorbs mechanical energy and thereby reduces or even prevents the formation of cracks and crazes in the underlying organic glass substrate.

It is therefore not critical that the thermoplastic film is permanently adhered to the substrate, and in a preferred embodiment, the method of the present invention further comprises, after the drilling step, a step (d) of removing the thermoplastic polymer film and adhesive from the substrate.

The film adhesion (peel strength) is measured according to ASTM D6862-04 Standard Test Method for 90 Degree Peel Resistance of Adhesives with an Instron 4485 equipment.

The elastic modulus is measured with TA Q800 DMA at static tensile mode at a stretching rate of 3 N/min on a sample cut in rectangle shape (12.0 mm×7.0 mm).

When the method of the present invention comprises removing the thermoplastic film after drilling, the adhesive used to laminate the film onto the substrate is preferably a pressure sensitive adhesive (PSA).

By "pressure-sensitive adhesive" it is meant a dry contact adhesive, generally of viscoelastic nature, which only needs a very slight pressure to adhere to the surfaces it is between. PSA are characterized by their ability to require no activation by water, solvent or heat to exert a strong adhesive holding force toward a surface. Pressure-sensitive adhesives are semi-solid adhesives, which form visco-elastic bonds that are aggressively and permanently tacky. They are available in solvent and latex based forms. The dry and unflowable PSA layers according to the invention may be formed by evenly applying a liquid form on either a geometrically defined surface of the lens substrate or on the thermoplastic polymer film. Thereafter, the deposited liquid latex layer is dried to an unflowable state by heating. Usually, heating will be performed at a temperature ranging from 40° C. to 130° C.

The final PSA layer has a low elastic modulus generally comprised between $10^3$ and $10^7$ Pa.

The typical PSA are acrylic-based, silicone-based, poly (vinyl pyrrolidone)-based and rubber-based PSA. They are preferably non-cross-linked.

Examples of rubber polymers, which can be used for formulating PSA are elastomeric materials, such as polyvinyl ethers, polyurethanes, natural and synthetic polyisoprene, polyisobutylene, polybutylene, polybutadiene, polychloroprene (neoprene), styrene-butadiene copolymers, styrene-isoprene copolymers, styrene-isoprene-styrene (SIS) and styrene-butadiene-styrene (SBS) block copolymers, polyacrylonitrile, polytetrafluoroethylene, polyvinylchloride, poly(vinylidene chloride), polychlorodienes, and copolymers or mixtures thereof.

Examples of acrylic polymers, which can be used for formulating PSA are poly(meth)acrylate acids and esters, such as isooctylacrylate/acrylic acid copolymers and mixtures thereof. Examples of silicone polymers, which can be used for formulating PSA include polyorgano-siloxanes, those described in Sobieski et al., "Silicone Pressure-sensitive Adhesives," Handbook of Pressure-Sensitive Adhesive Technology, 2nd ed., pp. 508-517 (D. Satas, ed.), Van Nostrand Reinhold, New York (1989). Suitable silicone-based pressure-sensitive adhesives are commercially available. They can be produced through the hydrolysis and polymerization of silanes and siloxanes.

If a PSA is used to laminate the thermoplastic polymer film onto the organic substrate, the polymer film can generally be removed by simply peeling it from the substrate and possibly cleaning the substrate to eliminate residual adhesive traces, if any.

Hot melt adhesives (HMA) are preferably used when the thermoplastic polymer film is permanently adhered to the substrate.

By "hot-melt adhesive", it is intended to mean a room temperature solid but flexible adhesive, which melts or drops in viscosity upon heating, and rapidly sets with cooling to create a bond. Most HMA can be repeatedly softened by heat and hardened or set by cooling (thermoplastic HMA), except for reactive HMA, which are applied like conventional HMA but form permanent, non melting bonds after cross-linking Additives such as siloxanes or water can be used as cross-linking agent.

An important property of HMA is their ability to solidify or "set" very rapidly under normal ambient conditions, preferably almost instantaneously, when cooling down from the application temperature. They are available in dry (solid) form and in liquid form (solvent based solution and water based latex). The HMA adhesive layer may be formed by evenly applying a liquid form either on the surface of the substrate or on the thermoplastic polymer. The deposited liquid is then dried to an unflowable state by heating. Usually, heating will be performed at a temperature ranging from 40° C. to 130° C. When a dry form is used, it is heated to the temperature where it will melt and flow readily, and then it is applied to either the surface of the substrate or the thermoplastic polymer. It can also be extruded into place by using a hot-melt extruder or die face.

Examples of polymers, which can be used for formulating HMA are solvent-free polyamides, polyethylene, polypropylene and other olefin-type polymers, polyurethanes, poly(vinyl pyrrolidone), polyesters, poly(meth)acrylic systems, and copolymers or mixtures thereof. The hot-melt adhesives according to the invention are preferably selected from dry poly(meth)acrylic latexes, such as the acrylic latex commercialized under the name Acrylic latex A-639 by Zeneca, dry polyurethane latexes, such as the latexes commercialized under the names W-240 and W-234 by Baxenden, dry polyester latexes and mixtures thereof. Preferred latexes are polyurethane latexes. Other preferred latexes are core/shell latexes such as those described in U.S. Pat. No. 6,503,631 and especially latexes based on alkyl(meth)acrylates such as butyl acrylate or butyl methacrylate.

The adhesive layer may be applied either to the optical substrate or to the thermoplastic film to be laminated onto the substrate. In one embodiment of the method of the present invention step (b) therefore comprises coating a thermoplastic polymer film of at least 40 μm, having an elastic modulus of at least 3 GPa with an adhesive layer and then applying and adhering the resulting adhesive film onto at least one surface of the substrate. In an alternative embodiment, step (b) comprises coating at least one surface of said substrate with an adhesive layer and applying and adhering onto said adhesive surface a thermoplastic polymer film having a thickness of at least 40 μm and an elastic modulus of at least 3 GPa.

The thermoplastic polymer may be any synthetic polymer having a high enough elastic modulus. The elastic modulus is typically comprised between 3 GPa and 10 GPa. The thermoplastic polymer used in the present invention has a glass transition temperature above room temperature (>25° C.). Otherwise the elastic modulus would not be high enough at room temperature. The glass transition temperature of the thermoplastic polymer of the film adhered to the organic substrate is generally comprised in the range of 50° C. to 250° C., preferably between 70 and 200° C.

Preferred thermoplastic polymers that may be used for the present invention are selected from the group consisting of triacetate cellulose (TAC), poly(ethylene terephthalate) (PET), polyamide, polystyrene, poly(methyl methacrylate), polycarbonate, and cyclic olefin copolymer (COC). The thermoplastic polymer film may also be a multilayer film comprising two or more layers of a thermoplastic polymer, for example a polarising multilayer structure comprising a stretched polyvinyl alcohol layer between two outer TAC layers. In this case the overall film must have a modulus of at least 3 GPa.

When the thermoplastic polymer film is adhered only temporarily to the substrate and removed after drilling, the polymer of course needs not to be transparent. When the polymer film is not meant to be removed after drilling, it preferably has a transmission of at least 90%.

The Applicant has observed that the ability of the polymer film to prevent chipping, cracking or crazing during the drilling of the optical article improves with increasing thickness of the thermoplastic film. It is difficult to obtain efficient protection with films thinner than 40 μm. The thermoplastic film preferably has a thickness of at least 50 μm and more preferably of at least 100 μm.

The upper limit of the film thickness of course is different for permanent and temporary films. Temporary films may be much thicker than permanent ones. The Applicant has observed that increasing the film thickness above 1 mm, generally does not result in better drilling performances of the optical article. For permanent films, the thickness preferably does not exceed 700 μm and more preferably is not higher than 300 μm.

The thickness of the adhesive layer preferably is comprised in the range of 1 to 50 μm, more preferably of 10 to 30 μm.

When the article to be drilled has a flat shape with two main surfaces, such as a screen plate or a lens, a polymer film is preferably laminated on both surfaces either temporarily or permanently.

The chemical nature of the organic glass forming the substrate of the optical article is not critical to the present invention as long as there are significant cracking and crazing problems when drilling through-holes in said substrates. The organic glass may be thermoplastic or thermoset materials and may be selected from the group consisting of polycarbonates, polyurethanes, poly(thiourethane), polyamides, polyimides, polysulfones, polycarbonate-ethylene terephthalate copolymers, polyolefines such as polynorbornenes, allyl diglycol carbonate homopolymers or copolymers, (meth)

acrylic homopolymers and copolymers, thio(meth)acrylic homopolymers and copolymers, epoxy resins and episulfide resins.

The applicant has observed that important drilling brittleness problems occur with poly(thiourethane) substrates having a refractive index of 1.74 which consequently are preferred organic substrates used in the present invention.

The method of the present invention also encompasses embodiments where the thermoplastic film is laminated not directly onto the substrate but to functional layers overlying said substrate, such as abrasion resistant hard-coatings, impact resistant coatings, anti-reflective coatings or anti-smudge coatings.

When laminating the adhesive thermoplastic film onto anti-smudge coatings, for example hydrophobic and oleophobic coatings based on fluorosilanes such as described in U.S. Pat. No. 4,410,563, EP 0203730, EP 749021, EP 844265, or EP 933377, it may be difficult to achieve the required minimum adhesion strength of 1.3 N/25 mm. As a matter of fact, the Applicant has observed that when a thermoplastic film was adhered via a PSA onto an organic lens coated with Optotool DSX, a fluorinated anti-smudge coating sold by Daikin, it could turn out to be difficult or even impossible to obtain the requested peel strength. A mean to overcome this difficulty is described in EP 1 392 613 where anti-smudge topcoats are overcoated with metallic fluoride or oxide coatings, such as $MgF_2$. As will be shown in Example 3 the use of such coatings may efficiently increase the peel strength of the thermoplastic film.

The organic glass articles protected by a thermoplastic film and submitted to drilling are preferably optical lenses and more preferably ophthalmic lenses. The method of the present invention is however not limited to lens drilling since the protective effect of the impact energy absorbing polymer film can be useful in a great number of applications whether in the field of optics or not.

EXAMPLES

Example 1

Permanent Film Lamination

A multiple layer polarizing film having an overall thickness of 200 μm and comprising a stretched polyvinyl alcohol layer of 40 μm between two 80 μm layers of triacetate cellulose (Sumitomo TAC/PVA/TAC Polarized Film 500×1000 mm provided by Sumitomo Chemical Company) was laminated onto the convex surface of aspheric uncoated semifinished single vision lenses having a refractive index of 1.74 commercialised by Essilor International under the reference Lyneis®.

The adhesive used was Bondthane UD-108, from Bond Polymers International. It is polyurethane based. The HMA was first spin coated onto the lens' convex side. The film was then laminated onto the lens' convex side at 180° C. under 20 psi for 2 minutes.

The peel strength as measured according to ASTM D6862-04 is >20 N/25 mm.

The TAC/PVA/TAC film has two different elastic modulus values. The elastic modulus along its machine direction is 4.7 GPa. The elastic modulus along its transverse direction is 3.5 GPa.

Four laminated lenses and four Lyneis® control lenses without any protective coating were drilled at different conditions with CNC Optidrill to a specific shape, Charmant No 5 frame, gauge 51. The drill speed is 12000 rpm. The drilling position, size and shape were set as "Charmant-1" and "8320-05 rill" on the local software. The concave side of the lenses was laid upward and drilling was operated from the concave side towards the convex side.

The below Table 1a) shows the results obtained with lenses according to the invention and comparative lenses when drilling under mild, aggressive and very aggressive conditions.
Mild conditions: drilling speed: 2 mm/s; drilling with peck; drill size 2.2 mm;
Aggressive conditions: drilling speed: 2 mm/s; drilling without peck, drill size 2.2 mm;
Very aggressive conditions: drilling speed: 6 mm/s; no peck, drill size 2.2 mm.

TABLE 1a

Drilling tests - Permanently laminated lenses

|  | Lenses with TAC/PVA/TAC | Control lenses |
|---|---|---|
| Mild drilling | 4/4 lenses passed without crack or chipping | 4/4 lenses passed without crack of chipping |
| Aggressive drilling | 4/4 lenses passed without crack or chipping | 4/4 lenses passed with few crack and chipping |
| Very aggressive drilling | 4/4 lenses passed without only one chipping at drilled site on concave side | 1/4 lens passed with several crack and chipping at drill site |

The drilled lenses were then submitted to fatigue tests including 5 accelerated aging cycles, each cycle comprising lens exposure 50° C. for 12 hours in an hygrometry saturated environment and lens/screws assembly fatigue test with 1000 dynamic pulling cycles. Microscopic pictures were taken on lens convex side before and after fatigue tests to document damage at drilled site.

TABLE 1b

Fatigue tests - Permanently laminated drilled lenses

|  | Lenses with TAC/PVA/TAC | Control lenses |
|---|---|---|
| Mild drilling | 4/4 lenses passed without further crack or chipping | 4/4 lenses passed without further crack or chipping |
| Aggressive drilling | 4/4 lenses passed without further crack or chipping | 4/4 lenses passed with further crack and chipping |
| Very aggressive drilling | 4/4 lenses passed without any further crack or chipping | 0/1 lens passed |

The above results show that under very aggressive drilling conditions, the laminated lenses according to the invention can be drilled without crack or chipping defects at the drilled site. The drilled lenses when submitted to fatigue tests show no further crack or chipping.

The comparative lenses all failed the "very aggressive drilling—fatigue" test.

Example 2

Lamination of Temporary Films—Criticality of High Elastic Modulus

A 80 μm TAC film according to the invention having an elastic modulus of 3.32 GPa (TD80 SL provided by Fuji) is compared to a comparative thermoplastic 66 μm polypropylene film (Duck® Brand tape provided by Henkel) having an elastic modulus of only 1.56 GPa. Both films are coated with acrylic PSA.

The adhesive thermoplastic films are laminated onto hardcoated semi-finished lenses having a refraction index of 1.74 commercialised by Essilor International under the reference Lyneis.

The TAC film was first heated at 128° C. for 12 seconds and then laminated onto lens' convex side at 20 psi for 1 minute. The peeling strength of both laminated films was higher than 20 N/25 mm.

The Duck® tape was first heated at 100° C. for 6 seconds, and then laminated onto the lens' convex side at 10 psi for 30 seconds.

Lenses with either TAC film or with PP film on their convex side and lenses without any film were drilled at very aggressive conditions (drilling speed 6 mm/s, no peck, 2.2 mm drill) with CNC optidrill, Charmant No 5 frame, gauge 51. The drilling position, size and shape were set as "Charmant-1" and "8320-05 rill" on the local software. The concave side of the lenses was laid upward and drilling was operated from the concave side towards the convex side.

After drilling, films were peeled off and lenses were submitted to fatigue test including 5 accelerated aging cycles, each cycle comprising lens exposure 50° C. for 12 hours in an hygrometry saturated environment and lens/screws assembly fatigue test with 1000 dynamic pulling cycles. Microscopic pictures were taken on lens convex side Table 3 shows the results obtained before and after fatigue test

TABLE 3

|  | TAC film | PP film | No film |
| --- | --- | --- | --- |
| After drilling under very aggressive conditions | 4/4 passed the drilling with no chipping nor crack | 4/4 passed the drilling with minor chipping and crack | 7/7 passed the test with serious chipping and crack |
| After fatigue test | 4/4 passed | 3/4 passed | 5/7 passed |

These results show that a thermoplastic PP film having an elastic modulus of only 1.56 GPa provides insufficient protection against chipping and cracking under very aggressive drilling conditions, whereas a TAC film with a higher elastic modulus does provide satisfactory protection against drilling defects.

Example 3

Criticality of Adhesion Force

In order to demonstrate the criticality of the adhesion force between the polymer film and the substrate, hard-coated semi-finished lenses (refraction index of 1.74, commercialised by Essilor International under the reference Lyneis) having a 25 nm thick anti-smudge Optotool DSX® top-coat (Daikin) were used.

When laminating a TAC film onto such lenses in the way described in Example 2, no improvement of drilling performances was observed with respect to lenses without TAC film. It was speculated that this was due to weak adhesion to the anti-smudge overcoat.

In order to increase the adhesion strength of the TAC-PSA film, the lenses were coated with $MgF_2$ which was supposed to increase the adhesion strength (see EP 1392613)

Below Table 4 shows the effect of increasing thickness of $MgF_2$ coatings on the peel strength and drilling performance under very aggressive drilling conditions (drilling speed: 6 mm/s, no peck, 2.2 drill bit).

TABLE 4

Peel force and drilling performance

| $MgF_2$ thickness | Peel force (N/25 mm) | Drilling performance |
| --- | --- | --- |
| 5 nm | 0.9 | Both drilling sites had chipping. |
| 10 nm | 0.7 | Films were off during drilling. |
| 15 nm | 0.7 |  |
| 20 nm | 1.5 | No chipping on both sides, although film could be off in some tests. |

It can thus be concluded that the minimum level of adhesion between films and substrate is necessary to obtain efficient protection against chipping and cracking under very aggressive drilling conditions.

The invention will be further described by the following numbered paragraphs:

1. A process of drilling organic glasses, comprising the following steps:
    (a) providing a substrate of organic glass, preferably of optical grade,
    (b) laminating onto at least one surface of said organic glass substrate via an adhesive layer selected from the group consisting of pressure sensitive adhesives and hot melt adhesives, a thermoplastic polymer film having a thickness of at least 40 μm and an elastic modulus of at least 3 GPa, the peel strength of the thermoplastic polymer on the organic glass substrate being higher than 1.3 N/25 mm, preferably of at least 1.5 N/25 mm, and
    (c) drilling a hole through the substrate and polymer film by means of a drill.

2. The process as paragraphed in paragraph 1, further comprising a step (d) of removing the thermoplastic polymer film and adhesive from the substrate.

3. The process as paragraphed in paragraph 1, wherein the polymer of the thermoplastic polymer film is selected from the group consisting of triacetate cellulose, poly(ethylene terephthalate), polyamide, polystyrene, poly(methyl methacrylate), polycarbonate and cyclic olefin copolymers.

4. The process as paragraphed in paragraph 1, wherein the thermoplastic polymer film having an elastic modulus of at least 3 GPa is a transparent film having a transmission of at least 90%.

5. The process as paragraphed in paragraph 1, wherein the substrate of organic glass is an ophthalmic lens substrate.

6. The process as paragraphed in paragraph 1, wherein the thickness of the thermoplastic polymer film is comprised between 50 μm and 1 mm, preferably between 100 mm and 700 mm.

7. The process as paragraphed in paragraph 1, wherein the adhesive layer has a thickness comprised in the range of 1 to 50 μm, preferably 10 to 30 μm.

8. The process as paragraphed in paragraph 1, wherein a thermoplastic polymer film is laminated on both sides of the substrate.

It is to be understood that the invention is not limited to the particular embodiments of the invention described above, as variations of the particular embodiments may be made and still fall within the scope of the appended claims.

The invention claimed is:
1. A process of drilling organic glasses, comprising the following steps:
    (a) providing a substrate of organic glass,
    (b) laminating onto at least one surface of said organic glass substrate via an adhesive layer selected from the group consisting of pressure sensitive adhesives and hot melt adhesives, a thermoplastic polymer film having a thickness of at least 40 μm and an elastic modulus of at least 3 GPa, the peel strength of the thermoplastic polymer on the organic glass substrate being higher than 1.3 N/25 mm, and (c) drilling a hole through the substrate and polymer film by means of a drill.

2. The process as claimed in claim 1, further comprising a step (d) of removing the thermoplastic polymer film and adhesive from the substrate.

3. The process as claimed in claim 1, wherein the polymer of the thermoplastic polymer film is selected from the group consisting of triacetate cellulose, poly(ethylene terephthalate), polyamide, polystyrene, poly(methyl methacrylate), polycarbonate and cyclic olefin copolymers.

4. The process as claimed in claim 1, wherein the thermoplastic polymer film having an elastic modulus of at least 3 GPa is a transparent film having a transmission of at least 90%.

5. The process as claimed in claim 1, wherein the substrate of organic glass is an ophthalmic lens substrate.

6. The process as claimed in claim 1, wherein the thickness of the thermoplastic polymer film is comprised between 50 μm and 1 mm.

7. The process as claimed in claim 1, wherein the adhesive layer has a thickness comprised in the range of 1 to 50 μm.

8. The process as claimed in claim 1, wherein a thermoplastic polymer film is laminated on both sides of the substrate.

9. A process as claimed in claim 1 wherein the organic glass is of optical grade.

10. A process as claimed in claim 1 wherein the peel strength of the thermoplastic polymer on the organic glass substrate is of at least 1.5N/25 mm.

11. The process as claimed in claim 1, wherein the thickness of the thermoplastic polymer film is between 100 mm and 700 mm.

12. The process as claimed in claim 1, wherein the adhesive layer has a thickness comprised in the range of 10 to 30 μm.

* * * * *